(12) United States Patent
Lev

(10) Patent No.: US 7,516,365 B2
(45) Date of Patent: Apr. 7, 2009

(54) SYSTEM AND METHOD FOR SPLIT HARDWARE TRANSACTIONS

(75) Inventor: Yosef Lev, Cambridge, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 80 days.

(21) Appl. No.: 11/831,636

(22) Filed: Jul. 31, 2007

(65) Prior Publication Data

US 2009/0031309 A1 Jan. 29, 2009

Related U.S. Application Data

(60) Provisional application No. 60/952,430, filed on Jul. 27, 2007.

(51) Int. Cl.
*G06F 11/00* (2006.01)
(52) U.S. Cl. .............................. 714/38; 714/5; 711/153
(58) Field of Classification Search .................. 714/38, 714/37, 5, 7, 42, 54; 711/147, 148, 153; 717/124, 126, 140; 719/325
See application file for complete search history.

(56) References Cited

U.S. PATENT DOCUMENTS

| | | | |
|---|---|---|---|
| 2007/0136365 A1* | 6/2007 | Tarditi et al. ............ | 707/103 R |
| 2007/0198519 A1* | 8/2007 | Dice et al. .................... | 707/8 |
| 2007/0198979 A1* | 8/2007 | Dice et al. .................. | 718/100 |
| 2007/0239942 A1* | 10/2007 | Rajwar et al. ............... | 711/147 |
| 2007/0300238 A1* | 12/2007 | Kontothanassis et al. .... | 719/320 |
| 2008/0127150 A1* | 5/2008 | Duffy et al. ................. | 717/159 |

OTHER PUBLICATIONS

Austen McDonald, JaeWoong Chung, Brian D. Carlstrom, Chi Cao Minh, Hassan Chafi, Christos Kozyrakis and Kunle Olukotun, "Architectural Semantics for Practical Transactional Memory," Computer Systems Laboratory, Stanford University, Proceedings of the 33rd International Symposium on Computer Architecture, 2006.
JaeWoong Chung, Chi Cao Minh, Brian D. Carlstrom and Christos Kozyrakis, "Parallelizing SPECjbb2000 with Transactional Memory," Computer Systems Laboratory, Stanford University, http://tcc.stanford.edu/publications/tcc_wtw2006_specjbb.pdf.

* cited by examiner

*Primary Examiner*—Dieu-Minh Le
(74) *Attorney, Agent, or Firm*—Robert C. Kowert; Meyertons, Hood, Kivlin, Kowert & Goetzel, P.C.

(57) ABSTRACT

A split hardware transaction may split an atomic block of code to be executed using multiple hardware transactions, while logically taking effect as a single atomic transaction. A split hardware transaction may use software to combine the multiple hardware transactions into one logically atomic operation. In some embodiments, a split hardware transaction may allow execution of atomic blocks including non-hardware-transactionable (NHT) operations without resorting to exclusively software transactions. A split hardware transaction may maintain a thread-local buffer logs all memory accesses performed by the split hardware transaction. A split hardware transaction may use a hardware transaction to copy values read from shared memory locations into a local memory buffer. To execute a non-hardware-transactionable operation, the split hardware transaction may commit the active hardware transaction, execute the non-hardware-transactionable operation, and then initiate a new hardware transaction to execute the rest of the atomic block.

20 Claims, 11 Drawing Sheets

SYSTEM AND METHOD FOR SPLIT HARDWARE TRANSACTIONS

PRIORITY CLAIM

This application claims benefit of priority of U.S. Provisional Patent Application No. 60/952,430, entitled "System and Method for Executing Atomic Blocks Using Split Hardware Transactions" and filed on Jul. 27, 2007.

BACKGROUND OF THE INVENTION

1. Field of the Invention

This invention relates generally concurrent access to shared objects, and more particularly, to a system and method for implementing split hardware transactions.

2. Description of the Related Art

In concurrent software designs and implementations, it is often important to ensure that one thread does not observe partial results of an operation that is concurrently being executed by another thread. Such assurances are important for practical and productive software development because, without them, it can be extremely difficult to reason about the interactions of concurrent threads.

Such assurances have often been provided by using locks to prevent other threads from accessing the data affected by an ongoing operation. Unfortunately, the use of locks may give rise to a number of problems, both in terms of software engineering and in terms of performance. First, the right "balance" of locking must be achieved, so that correctness can be maintained, without preventing access to an unnecessary amount of unrelated data (thereby possibly causing other threads to wait when they do not have to). Furthermore, if not used carefully, locks can result in deadlock, causing software to freeze up. Moreover, it is frequently the case that whenever a thread is delayed (e.g. preempted) while holding a lock, other threads must wait before being able to acquire that lock.

Transactional memory is a paradigm that allows the programmer to design code as if multiple locations can be accessed and/or modified in a single atomic step. As typically defined, a transactional memory interface allows a programmer to designate certain sequences of operations as "atomic blocks", which are guaranteed by the transactional memory implementation to either take effect atomically and in their entirety (in which case they are said to succeed), or have no externally visible effect (in which case they are said to fail). Thus, with transactional memory, it may be possible in many cases to complete multiple operations with no possibility of another thread observing partial results, even without holding any locks. The transactional paradigm can significantly simplify the design of concurrent programs.

Transactional Memory (TM) allows programmers to use transactional or atomic blocks, which may be considered sequential code blocks that should be executed atomically. In other words, executions of atomic blocks by different threads do not appear to be interleaved. To execute an atomic block, the underlying system may begin a transaction, execute the atomic block's memory accesses using that transaction, and then may try to commit the transaction. If the transaction commits successfully, the atomic block's execution seems to take effect atomically at the transaction's commit point. If it fails, the execution does not seem to take effect at all and the atomic block might be retried using a new transaction. It is the responsibility of the TM implementation to guarantee the atomicity of operations executed by transactions.

Transactional memory is widely recognized as a promising paradigm for allowing a programmer to make updates to multiple locations in a manner that is apparently atomic, while addressing many of the problems associated with the use of locks. In general, transactional memory can be implemented in hardware, with the hardware directly ensuring that a transaction is atomic, or in software that provides the "illusion" that the transaction is atomic, even though in fact it is executed in smaller atomic steps by the underlying hardware.

TM can be implemented in hardware (HTM) or in software (STM). While HTM solutions are generally faster than STM ones, many of the traditional HTM implementations do not support certain operations or events (like context switches, interrupts, or even the entry code of a function) while executing a transaction. Generally, if any of these events happens while executing a hardware transaction, the transaction is aborted. Operations that cause hardware transactions to fail or abort may be referred to as Non-Hardware-Transactionable (NHT) operations.

Traditionally, systems implement or support only a single type of transactional memory implementation. Moreover, a programmer generally must know about, and write code to support, the particular interfaces for implementing transactional memory. Furthermore, even if a system supports a particular transactional memory implementation that implementation may not guarantee to support all transactions. For example, a system may support a "best-effort" hardware transactional memory (HTM) implementation, but since the implementation is "best-effort" not all transactions may be guaranteed to be supported. Thus, a programmer may wish to include functionality to fall back to more a flexible, if slower, transactional memory implementation that may guarantee support for all transactions. In order to do so, the programmer may have to specifically write code to support both the faster "best-effort" implementation and the slower fallback implementation at every location in the application for which the programmer wishes to execute instructions atomically.

SUMMARY

Transactional memory (TM) may support code sections that are to be executed atomically, i.e., so that they appear to be executed one at a time, with no interleaving between the steps of one transaction and another. This may allow programmers to write code that accesses and/or modifies multiple memory locations in a single atomic step, significantly reducing the difficulty of writing correct concurrent programs.

A split hardware transaction (SpHT) may split an atomic block of code so that it may be executed using multiple hardware transactions, while logically taking effect as a single atomic transaction. Although a split hardware transaction may use some software support to combine the different hardware transactions into one logically atomic operation, it may execute much faster than a corresponding software transaction executing the same atomic block.

In some embodiments, a split hardware transaction (SpHT) may allow execution of atomic blocks including non-hardware-transactionable (NHT) operations without resorting to exclusively software transactions. For instance, a split hardware transaction may use a collection of hardware transactions that allows an atomic block to be split so the NHT operations may be performed between these hardware transactions. In other words, a split hardware transaction may pause by committing an active hardware transaction, perform one or more NHT operations and then resume, initiating another hardware transaction to continue executing the split hardware transaction.

Additionally, a split hardware transaction may utilize a thread-local buffer to log and/or maintain all memory accesses performed by the split hardware transaction. A split hardware transaction may begin by initiating a hardware transaction and using it to execute the atomic block's memory accesses. For example, the split hardware transaction may use the active hardware transaction to access various locations in shared memory, to copy values read from those locations into a local memory buffer, and to temporarily buffer shared-memory write operations of the atomic block in the same or a different local memory buffer. Additionally, to commit the split hardware transaction, the active hardware transaction may copy some values from the thread-local buffer to their appropriate locations in shared memory, and by that making the atomic block's effect visible to all other threads.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

A split hardware transaction (SpHT) involves splitting an atomic block of code so that it will be executed using multiple hardware transactions, while logically seeming to take effect as a single atomic transaction. In some embodiments, a split hardware transaction (SpHT) may allow execution of atomic blocks including NHT operations without relying on exclusively software transactions. For instance, a split hardware transaction may use a collection of hardware transactions that are combined together (using some software support) so that they logically seem to take effect atomically. This allows an atomic block to be split so that it will be executed using multiple hardware transactions, while executing the NHT operations in between the hardware transactions. Although a split hardware transaction may use some software support to combine the different hardware transactions into one logically atomic operation, it may execute much faster than a corresponding software transaction executing the same atomic block.

Figure 1:
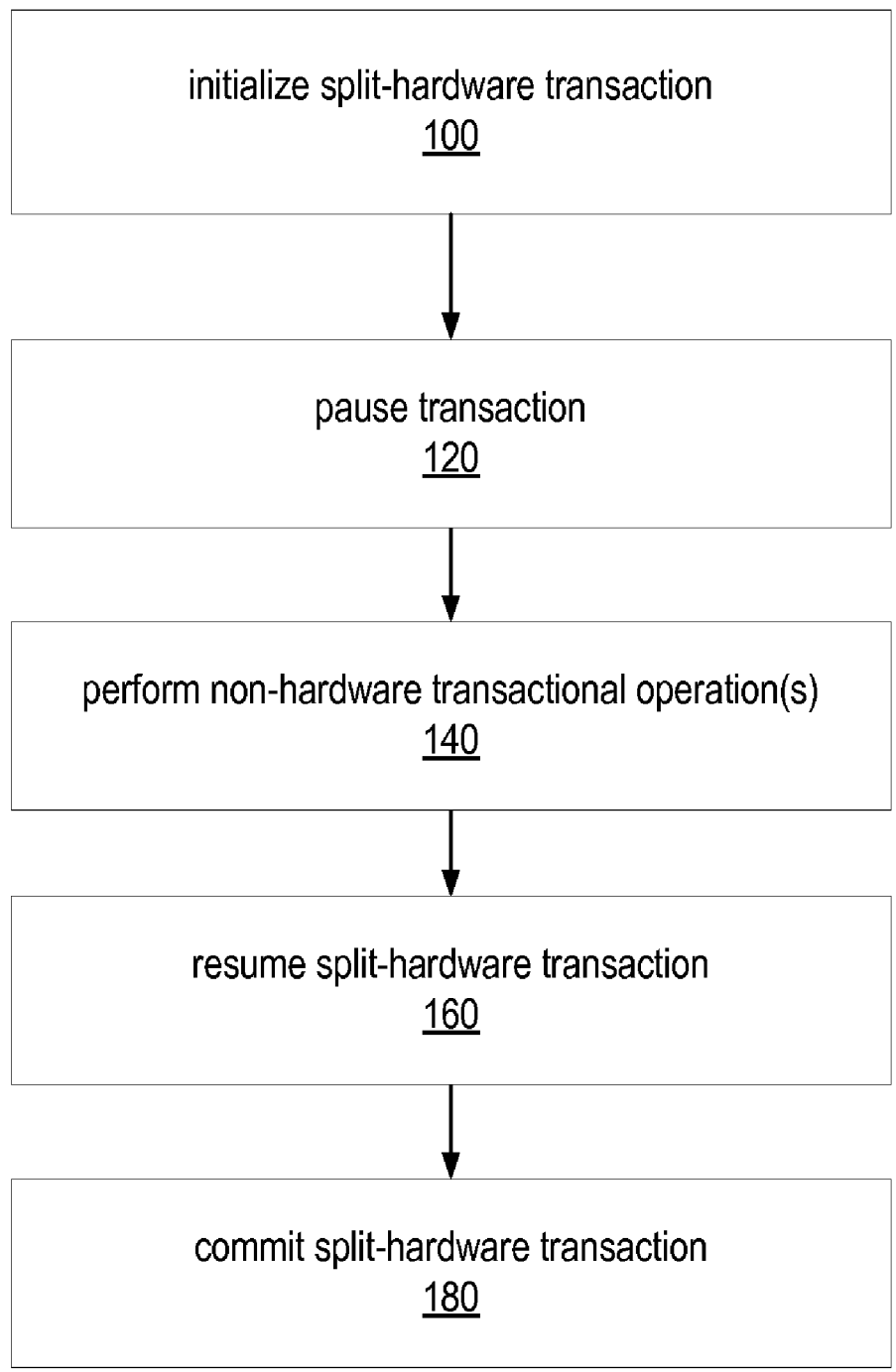
FIG. 1 is a flowchart illustrating one embodiment of a method for using a split hardware transaction, as described herein.

FIG. 1 is a flowchart illustrating one embodiment of a method for using split hardware transactions, as described herein. First of all, the split hardware transaction may be started or initialized, as illustrated by block 100. In some embodiments, the split hardware transaction may then initialize a hardware transaction.

To execute a NHT operation, the split hardware transaction may pause, as indicated by block 120, and commit the active hardware transaction. After performing or executing the NHT operation(s) as illustrated by block 140, the split hardware transaction may resume, as indicated by block 160. According to some embodiments, as part of resuming, the split hardware transaction may initiate a new hardware transaction to execute the rest of the atomic block. Additionally, the split hardware transaction may ultimately try committing to shared memory, as indicated by block 180. In some embodiments, the active hardware transaction initiated as part of resuming the split hardware transaction may also be used to commit the overall split hardware transaction. In some embodiments, a split hardware transaction that fails to commit may be retried one or more times.

A split hardware transaction may utilize a thread-local buffer that maintains and/or logs all memory accesses it executes. A split hardware transaction may begin by initiating a hardware transaction and using it to execute the atomic block's memory accesses. For example, the split hardware transaction may use the active hardware transaction to access various locations in shared memory and to copy some values read from those locations into a read-set maintained in the thread-local buffer. For example, in some embodiments, some writes executed by the atomic block may be logged in a write-set maintained in the thread-local buffer and not written in the shared memory until the SpHT commits.

The information stored in the local buffer by the first hardware transaction may be used as a checkpoint for a second hardware transaction, so that it can restore the state of the first hardware transaction and verify that this state is consistent with the current state of the memory. In other words, a second hardware transaction initiated by the SpHT can use the information stored by the first transaction in the thread-local buffer, to verify that no other process or thread modified any of the shared memory locations accessed by the first hardware transaction after the first hardware transaction has committed and prior to beginning the second hardware transaction.

Because a split hardware transaction's buffer may be local to the thread executing the split hardware transaction, in some embodiments, it is guaranteed that no other thread sees the effect of committing the first hardware transaction of a split hardware transaction. Finally, to commit the split hardware transaction, the active hardware transaction may copy the values from the thread-local buffer to their appropriate locations in shared memory, thereby making the atomic block's effect visible to all other threads upon successful completion of that hardware transaction.

Note that although the operations executed while the split hardware transaction is paused may not be part of its atomic operation, such operations may take advantage of the fact that all read and write operations performed by the split hardware transaction prior to being paused may be logged in the local buffer. In one embodiment, a debugger may be able to implement a breakpoint in an atomic block, which might normally cause a hardware transaction to abort. For example, a debugger may pause a split hardware transaction and examine the transaction's local buffer to discover what values were read and written by the atomic block's execution up to the breakpoint.

In some embodiments, a split hardware transaction may not require any additional hardware support other than a basic hardware transactional memory solution. Thus, split hardware transactions may be implemented utilizing the most basic best-effort hardware transactional memory solution. Therefore, a split hardware transaction mechanism may allow a wider variety of atomic blocks, such as those including NHT operations, to be executing using, with some software support, any of various hardware transactional memory implementations. Although executing an atomic block with a SpHT uses some software support (e.g., to manage the thread-local memory buffers), it may be much faster than an execution using a purely software transaction due, at least in part, to the SpHT's use of multiple hardware transactions.

Finally, note that since, in some embodiments, the SpHT algorithm relies on hardware transactions, a split hardware transaction may fail to execute some atomic blocks. For example, a split hardware transaction may fail to execute atomic blocks that access more memory locations than are supported by the underlying HTM implementation. However, the SpHT algorithm may, in some embodiments, be combined with other hardware and software transaction mechanisms in a hybrid approach, as will be discussed in more detail below, to achieve a robust and efficient TM solution.

As described above, a programmer may write code specifying that certain operations, functions, etc., should be executed atomically. In some embodiments, the operations may not actually be executed atomically, but may appear to be executed atomically to other processes or threads also executing in the same system. When generating a compiled version of an application including the source code, a compiler, such as compiler 220 (illustrated in FIG. 2, discussed below) may analyze the programmer's source code and rather than directly compiling the atomic block specified by the programmer, may decide to generate code configured to execute the atomic block using the split hardware transaction mechanism.

Figure 2:
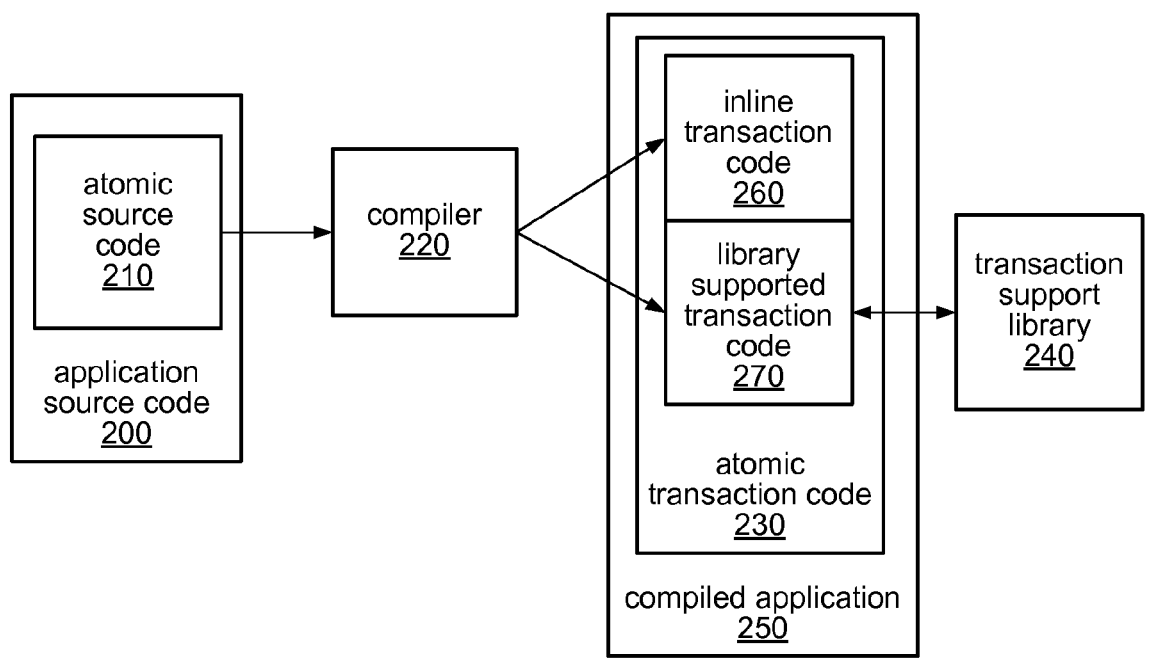
FIG. 2 is a block diagram illustrating a compiler generating split hardware transaction code, as described herein.

FIG. 2 is a block diagram illustrating a compiler 220 configured to analyze application source code 200, identify one or more sets of atomic source code 210 and then generate atomic transaction code 230 as part of a compiled application 250. A compiler, such as compiler 220 may be configured to replace programmer written code that is to be executed atomically, such as in atomic source code 210, with code for implementing a split hardware transaction, such as atomic transaction code 230. For example, a programmer may write the source code for an application, such as application source code 200, using atomic blocks to specify sets of instructions that should be executed atomically and/or as a transaction. For example, the program may include sets of instructions to be executed atomically together within a set of curly brackets (e.g., "{ }") preceded by the term "atomic", thus indicating that the instructions within the brackets should be executed atomically.

Compiler 220 may, such as during the compilation of application source code 200, identify one or more sets of instructions to be executed atomically, such as by recognizing the atomic keyword, in one embodiment. In other embodiments, a programmer may use other or additional manners to indicate sets of instructions to be executed atomically. For instance, in one embodiment, a programmer may designate that certain methods and/or functions should be executed atomically, such as by using the atomic keyword (or some other language construct) in the method or function definition. In other embodiments operations to be executed atomically may be designated using pairs of keywords, such as "transactional_memory_section_begin" and "transactional_memory_section_end", to specify the beginning and end, respectively, of a group of operations. Thus, compiler 220 may be configured to identify sets of instructions or other fragments or portions of an application (e.g., functions, objects, method, classes, etc) by recognizing any of various language constructs that may be used to designate those instructions, fragments or portions to be executed atomically.

A programmer may also use a particular language construct, such as an atomic keyword, to designate specific data structures, classes and/or objects that should be accessed using transactions. Thus, in some embodiments, compiler 220 may be configured to recognize such atomic structures, classes and/or objects and to generate code to ensure that they are accessed using transactions.

Additionally, compiler 220 may, in some embodiments, be configured to generate code configured to determine at runtime whether or not an atomic block includes any non-hardware-transactionable (NHT) operations. In some embodiments, compiler 220 may be configured to generate split hardware transaction source code to pause the split hardware transaction prior to executing the NHT operations and to resume the split hardware transaction after completion of the NHT operations. As noted above, when a split hardware transaction is paused, any active hardware transaction of the split hardware transaction may be committed and when the split hardware transaction is resumed, a new hardware transaction may be initiated. Thus, compiler 120 may, in some embodiments, be configured to generate code for committing active hardware transactions when pausing a split hardware transaction prior to performing NHT operations and to generate code for initializing new hardware transactions when resuming a paused split hardware transaction.

As described previously, programmers may write transaction code once using familiar coding styles, but the transaction may be effected according to one of a number of compatible alternative implementation techniques. Programmers may not need to write multiple versions of their code in order to exploit alternative implementation approaches, or even be specifically aware of the particular transaction implementations. Instead, the transaction code written by the programmer may be translated, replaced or transformed into code that is configured to implement transactions according to any of various techniques, including SpHT. In some embodiments, the particular technique implemented for each transaction may not be decided until runtime. The compiler may enable the implementation of multiple, alternative transactional memory schemes. At runtime, any of the various implemented techniques may be used to effect the transaction and if a first technique fails or is inappropriate for a particular transaction, one or more other techniques may be attempted.

In yet other embodiments, compiler 220 may be configured to generate both inline transaction code 260 and library supported transaction code 270 in atomic translation code 230, as illustrated by FIG. 2. For example, inline transaction code 260 may be configured to implement certain transaction techniques, such as a default transaction technique, while library supported transaction code 270 may be configured to implement other transaction techniques. Additionally, when atomic transaction code 230 includes both inline transaction code 260 and library supported transaction code 270, different parts of transaction techniques may be performed by inline transaction code 260 or by library supported transaction code 270, according to various embodiments.

For example, in some embodiments, library supported transaction code 260 may be configured to call functions provided by transaction support library 240 to determine which transaction technique to use for a particular transaction, but inline transaction code 260 may include the functionality for implementing that transaction technique as one of the multiple code paths generated by compiler 220. For instance the following pseudo-code represents one possible embodiment of functionality included in atomic transaction code 230:

```
do
    // ask support library which code path to use
    i = whichCodePath( ... );
    ...
        attempt to execute transaction using codepath i
    ...
until attempt succeeds
```

While described herein mainly in terms of a compiler, compiler 220 may also represent other entities configured to generate atomic transaction code 230, according to different embodiments. For instance, in one embodiment, compiler 220 may represent a code optimizer rather than a compiler. In another embodiment, compiler 220 may represent a just-in-time (JIT) compiler rather than a more standard compiler. In some embodiments, compiler 220 may represent an assembler rather than a compiler. In general, compiler 220 may represent any entity capable of and configured to generate atomic transaction code for implementing multiple, alternative transaction methods, as described herein. While described herein as various software entities, compiler 220 may, in some embodiments, represent a hardware-based entity configured to generate atomic transaction code for implementing multiple, alternative transaction methods.

Atomic source code 210 may represent code instructions in any of various languages, according to various embodiments. For example, in some embodiments, atomic source code 210 may represent code written in a high level programming language, such as C, C++, or Java™. In other embodiments, atomic source code 210 may represent binary instructions or assembly language instructions. In yet other embodiments, atomic source code 210 may also represent compiler-intermediate instructions, or virtual machine byte code instructions, such as Java™ byte code instructions.

In some embodiments, atomic transaction code 230 may be configured to include all the various code paths for implementing split hardware transactions inline, such as in inline transaction code 260. In other embodiments, however, atomic transaction code 230 may be configured to utilize and/or include a library of transaction enabling code, such as transaction support library 240. Atomic transaction code 230 may be configured to call various functions provided by transaction support library 240. Transaction support library 240 may include the actual functionality to execute split hardware transactions in some embodiments. Thus, in some embodiments, compiler 220 may be configured to generate atomic transaction code 230 to include library supported transaction code 270 configured to call functions provided by transaction support library 240 to implement split hardware transactions.

Atomic transaction code 230 may include inline transaction code 260, library supported transaction code 270 or both, according to various embodiments. Thus, functionality described herein as being performed by atomic transaction code 260 may be performed by inline transaction code 260 in some embodiments and by library supported transaction code 270 in other embodiments. For example, in some embodiments, inline transaction code 260 may include the functionality to implement split hardware transactions. In other embodiments, however, library supported transaction code 270 may be configured to call one or more functions of transaction support library 240 to implement split hardware transactions.

The SpHT Algorithm

In some embodiments, a split hardware transaction may be implemented in transaction support library 240. For example, in one embodiment, transaction support library 240 may be configured to expose an API of functions for implementing split hardware transactions. For instance, in one embodiment, transaction support library 240 may be configured to expose an API including, but not limited to, the following functions or operations: SpHT_begin, SpHT_read, SpHT_write, SpHT_pause, SpHT_resume and SpHT_commit. Thus, SpHT_begin may be called to initiate a split hardware transaction, SpHT_read and SpHT_write may be used for all read and write operations during the transaction and SpHT_commit may be used to try committing the split hardware transaction. SpHT_pause may be used to temporarily stop the split hardware transaction, such as to execute a NHT operation, while SpHT_resume may be called to continue a paused split hardware transaction. In some embodiments, SpHT_pause may commit any active hardware transaction of the SpHT and SpHT_resume may initiate a new hardware transaction.

A SpHT may maintain thread-local memory buffers or sets. For example, in one embodiment, a SpHT may maintain two thread-local sets: a read set and a write set. The read set includes the values for each location read by the SpHT. This value may be referred to as the pre-transactional value of the location. The write set may include the latest value for each location written by the SpHT. Remember that the SpHT may maintain all values to be written to the shared memory locally until the SpHT is committed (using a hardware transaction). The SpHT may begin with empty read and write sets in the local buffer. To read location l, the SpHT_read operation may first check whether the write set contains an entry for l. If it does, SpHT_read may simply return the value stored in that entry. Otherwise it may read the value from location l (from shared memory) and add to the read set an entry for l, if such does not already exist. A SpHT_write operation may add an entry to the write set (or update an existing one) for the written location with the written value. In other words, a split hardware transaction may only modify values in the local write set until the entire atomic block (executed by the split hardware transaction) is committed.

Figure 3:
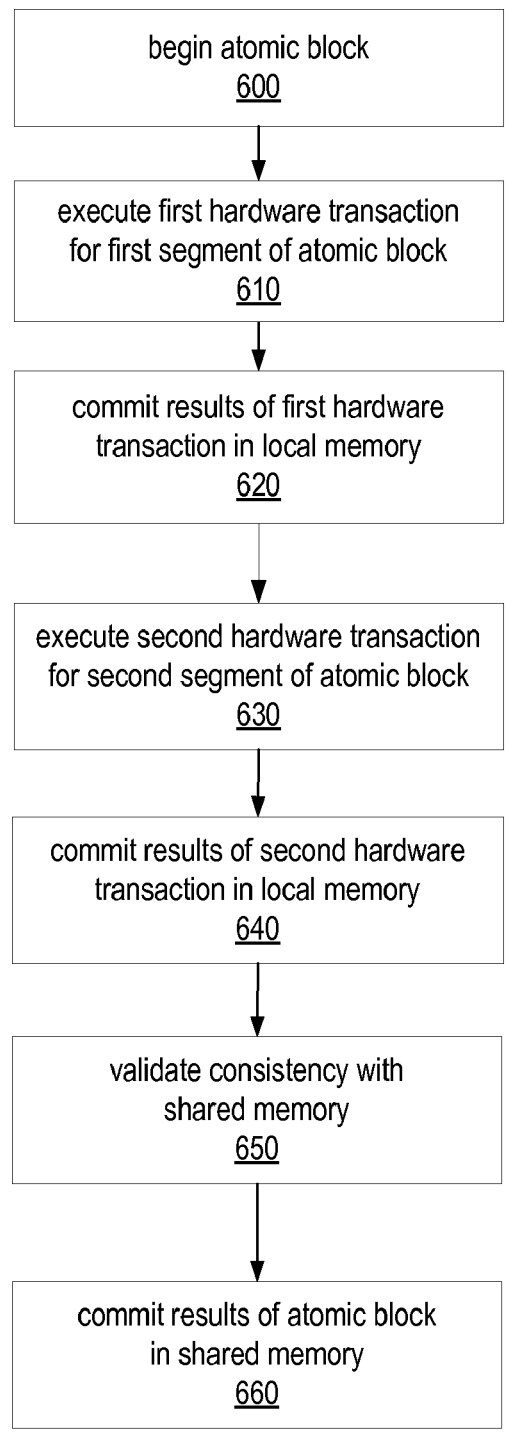
FIG. 3 is a flowchart illustrating one embodiment of a method for executing a split hardware transaction, as described herein.

FIG. 3 illustrates one embodiment of a method for executing split hardware transactions, as described herein. In this example, an atomic block of code that performs read and write operations to and from a shared memory is begun, as illustrated by block 600. As noted above, a programmer may designate a block of code for atomic execution by marking source code with particular keywords, by calling particular functions from a transaction support library, or by other means. In this example, the atomic block may be split into two segments and atomicity may be guaranteed across the two segments through the use of supporting software instructions and data structures (e.g., thread-local buffers), as described herein.

Execution of the first segment of the atomic block may be executed as a first hardware transaction, as described above. This is illustrated by block 610. Execution of the first segment may include executing read operations by reading from a shared memory into a local memory to log read accesses, in some embodiments. Execution of the first segment may also include executing write operations by writing values to the local memory, rather than to the shared memory. Because the first segment is executed as a first hardware transaction, reads and writes within the segment are guaranteed to be executed atomically. Once complete, the results of the first segment are committed to the local memory, as shown in block 620.

In the example illustrated in FIG. 3, the method may include executing the second segment of the atomic block as a second hardware transaction, as in block 630. In some embodiments, before execution of the second hardware transaction begins, a determination may be made as to whether any locations in the shared memory accessed by a read operation in the first transaction were changed since the time the first transaction was committed (not shown). If so, the entire atomic block may be aborted or it may be retried, in different embodiments, as discussed herein.

As was the case with the first segment, execution of the second segment may include executing read operations by reading from a shared memory into a local memory to log read accesses, in some embodiments and executing write operations by writing values to the local memory, rather than to the shared memory. Because the second segment is executed as a second hardware transaction, reads and writes within the segment are guaranteed to be executed atomically. Once complete, the results of the second segment are committed to the local memory, as shown in block 640.

As illustrated in FIG. 3, once both the first and second segments of the atomic block have successfully completed and committed their results in local memory, the method may include validating that the current contents of locations in the shared memory that were read by the atomic block are consistent with the values copied from the shared memory to the local memory. This is illustrated in block 650. If the values previously read are inconsistent with the current state of those shared memory locations, execution of the atomic block may be aborted or retried, in various embodiments.

If the values previously read by the atomic block and copied into the local memory are consistent with the current state of the shared memory, the results of the atomic block may be committed. This is illustrated in block 660. For example, in some embodiments, the results committed by the second transaction may be copied to the shared memory from the local memory in response to successfully committing the results of the second transaction and validating memory consistency. In this example, although the atomic block was executed using two separate hardware transactions, it may appear to the shared memory (and to other processes accessing the shared memory) that the first and second segments of the atomic block were executed by a single hardware transaction.

Figure 4:
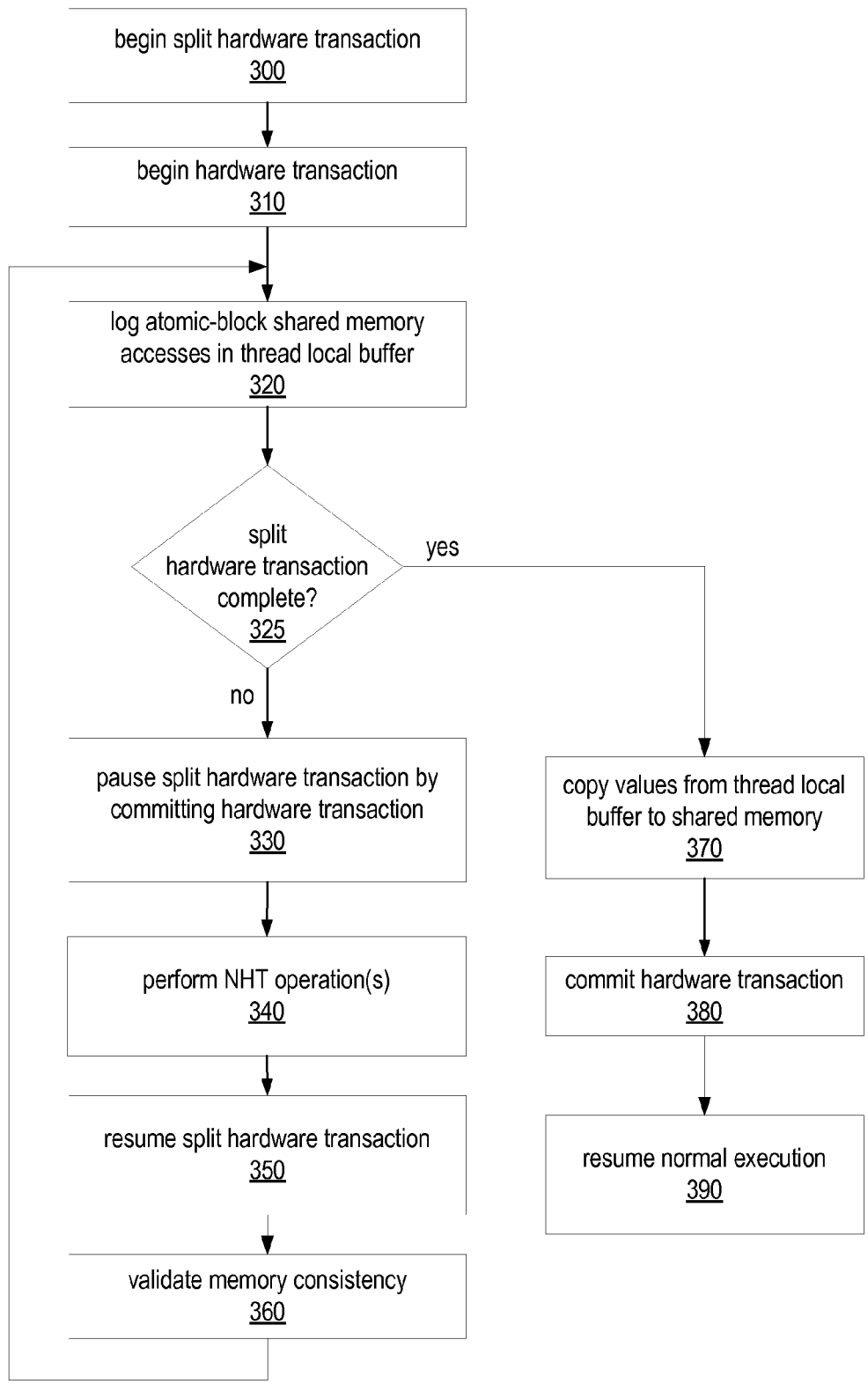
FIG. 4 illustrates one embodiment of a method for implementing a split hardware transaction, as described herein.

FIG. 4 illustrates another embodiment of a method for implementing a split hardware transaction, as described herein. A split hardware transaction is begun, as illustrated by block 300. As noted above, in some embodiments, a split hardware transaction may be started because a programmer specifically coded a split hardware transaction, such as by calling functions from transaction support library 240. In other embodiments, as will be described in more detail below, a compiler may have implemented a split hardware transaction in response to a programmer specifying a particular section of code as an atomic block, such as by using an atomic keyword. In yet other embodiments, a split hardware transaction may be started as part of a transaction solution that uses different transactional schemas. For instance, a compiler may implement transactional code that first attempts one transactional technique, such as a pure hardware transaction, and if that fails, then attempts a different transactional technique, such as a split hardware transaction.

When starting a split hardware transaction, the atomic source code may call a function, such as SpHT_begin. The SpHT_begin operation may initiate a new hardware transaction, as indicated by block 310. Since a single split hardware transaction may involve multiple hardware transactions, the most recent hardware transaction initiated by the split hardware transaction may be referred to as the active transaction. In general, all memory accesses within a split hardware transaction are done using the active hardware transaction. In addition, after beginning the hardware transaction, as illustrated by block 310, the split hardware transaction may log the accesses to shared memory performed by the atomic-block to a thread-local memory buffer, as indicated by block 320 and as described above regarding SpHT read and write operations. For instance, the split hardware transaction, may copy values for all the locations in the shared memory that may be affected by, or that may affect, the split hardware transaction. Also, at any time during its execution (i.e., before the SpHT is complete, indicated by the negative exit from 325), the split hardware transaction may be paused by committing the active hardware transaction, as indicated by block 330.

In some embodiments, the split hardware transaction may commit the active hardware transaction as part of pausing the split hardware transaction. For example, a function to pause the split hardware transaction, such as SpHT_pause, may be configured to also commit the active hardware transaction. In one embodiment, a split hardware transaction may be coded to pause the transaction because of one or more non-hardware-transactionable (NHT) operations, or an NHT event, such as a system interrupt, a context switch, or other system event.

After pausing the split hardware transaction, as illustrated by block 330, one or more non-hardware-transactionable (NHT) operations may be performed, as indicated by block 340. As noted above, any of various types of functions, procedures, and/or other operations or events, such as context switches or system interrupts, may cause the active hardware transaction to fail. Thus, a split hardware transaction tries committing the active hardware transactions prior to executing any NHT operation or event.

After the NHT operation or event is executed, the split hardware transaction may be resumed, as indicated by block 350. In some embodiments, a split hardware transaction may be resumed by calling a function such as SpHT_resume. In some embodiments, when resuming, a split hardware transaction may begin a new hardware transaction, which may restore the state of the previous active transaction by reading all shared memory locations stored in the local read set and verifying that they still have their pre-transactional values, thus validating memory consistency as illustrated by block 360. In other words, a split hardware transaction may, upon resuming, verify that all the locations read by the split hardware transaction still have the same values as when they were previously read by the split hardware transaction. If another process or thread modified one or more of the values copied from the shared memory to the local memory buffer, the split hardware transaction may be retried, in part or in whole, or may return a failure. In some embodiments, the SpHT may resume, execute some additional read/write operations and the corresponding logging, as described above regarding block 320, for additional segments of the split hardware transaction, as indicated by the feedback loop from block 360 to block 320. In some embodiments, following execution of the final hardware transaction (i.e., when the SpHT operations are complete, indicated by the positive exit from 325), the SpHT may attempt to commit, as indicated by the arrow from the output of block 325 to block 370.

Additionally, the split hardware transaction may be completed by using the active hardware transaction (block 370) to copy the values from the write set to the appropriate locations in shared memory and committing the active hardware transaction, as indicated by block 380. In other words, since the active hardware transaction may include the last hardware transaction of the SpHT, committing it may commit the split hardware transaction. A split hardware transaction commits successfully if and only if all hardware transactions it initiated were either retried or committed successfully, according to some embodiments. After committing the final hardware transaction, as illustrated by block 380, normal execution may be resumed, as indicated by block 390.

The example embodiment discussed above regarding FIG. 4 may have involved a split hardware transaction that uses two hardware transactions—one to initially read values from shared memory into the local buffer prior to performing an NHT operation and another to finish and commit the split hardware transaction after performing the NHT operation(s). In other embodiments, however, a split hardware transaction may utilize more than two hardware transactions. In general, a split hardware transaction may be implemented using virtually any number of hardware transactions.

One reason the SpHT may be considered to be logically atomic is that each hardware transaction initiated by the SpHT may verify that all locations read by the SpHT so far have their pre-transactional values, as indicated by the read-set maintained in the thread-local buffer. An active hardware transaction of a split hardware transaction aborts if any relevant location has changed during execution of the split hardware transaction. This guarantees that as long as no active transaction is aborted, all values read by the SpHT represent a consistent view of memory. In particular, when the last hardware transaction, that copies the values from the thread-local write-set to shared memory, commits, all locations read by the SpHT are guaranteed to contain their pre-transactional values. Therefore the SpHT may seem to take effect atomically at this point, in which all values written by the SpHT become visible to all other threads, and all locations read by the SpHT are guaranteed to have their pre-transactional values, Finally, note that operations executed between SpHT_pause and SpHT_resume may require some care. These operations may be executed non-transactionally, and therefore may take effect immediately and not when the SpHT takes effect (e.g., is committed). In particular, these operations may not be undone or rolled-back if the split hardware transaction aborts.

In some embodiments, a split hardware transaction may be configured to execute atomic blocks that include function calls even when the underlying hardware transactional memory implementation does not support function calls, such as because the function entry and exit code contain NHT instructions. Thus, while a hardware transaction may be aborted by the function's entry and/or exit code, a SpHT can be paused before and resumed after these code segments are executed, allowing atomic blocks that include function calls to be executed atomically while still benefiting best effort hardware transactional memory (HTM).

Figure 5:
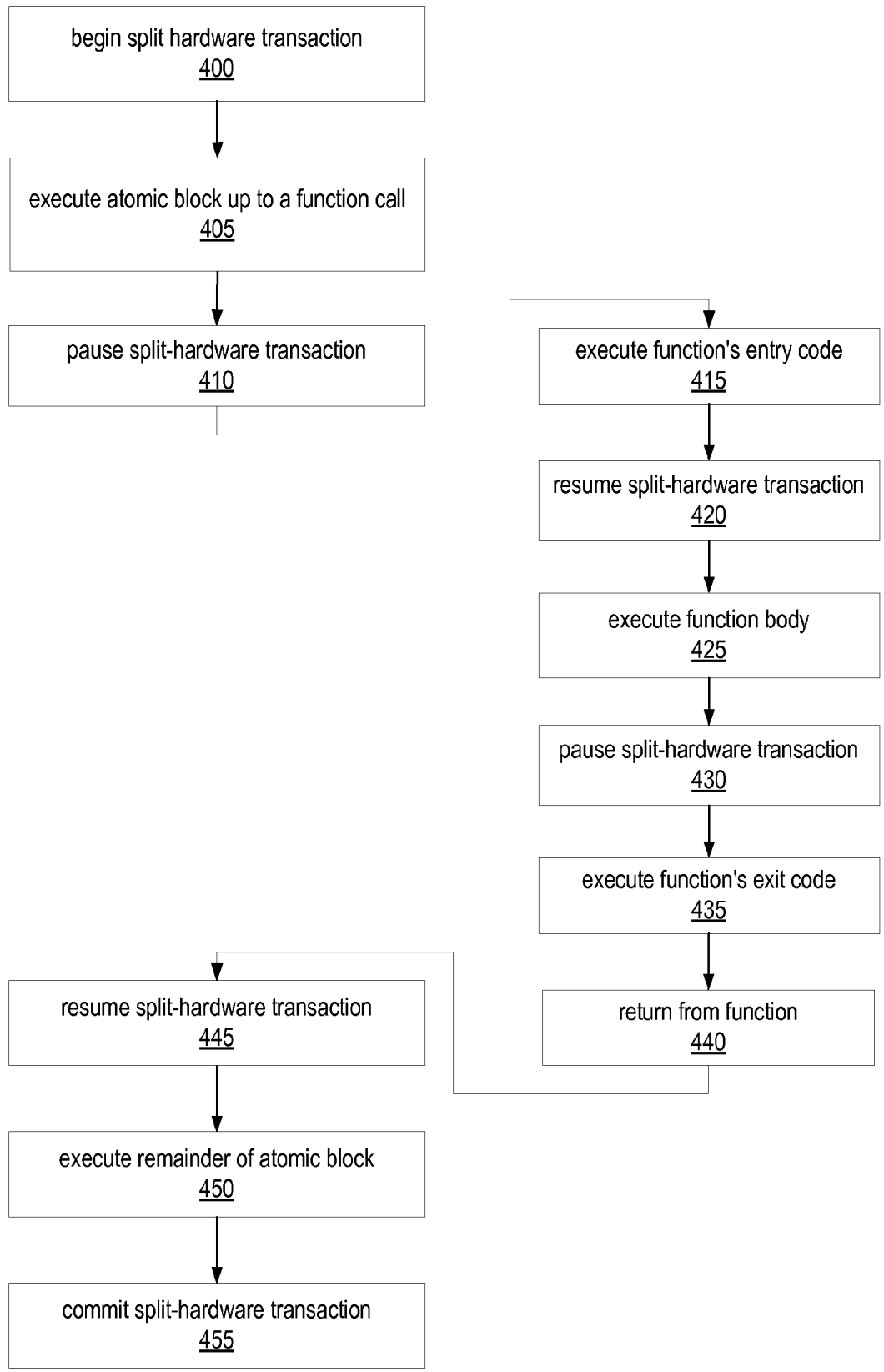
FIG. 5 illustrates one embodiment of a method for executing a function call within a split hardware transaction.

FIG. 5 illustrates one embodiment of a method for executing an atomic block that contains a function call using a split hardware transaction. For example, a split hardware transaction may begin, as illustrated by block 400 and may execute the atomic block up to a function call, as indicated by block 405. Since the called function's entry and/or exit code may perform a NHT operation, for example pushing or popping a stack frame, the split hardware transaction may be paused before executing the function's entry code, as indicated by block 410. The split hardware transaction may, in some embodiments, be paused by calling SpHT_pause or another function provided by transaction support library 240. The called function may then execute its entry code, as illustrated by block 415, and may also be configured to resume the split hardware transaction, as indicated by block 420. By pausing and resuming the split hardware transaction around a called function's entry and/or exit code, the body of the function call may executed as part of the split hardware transaction.

The function body may then be executed, as indicated by block 425. In some embodiments, the function body may read, write and operate on values from the shared memory or on those stored in the local buffer. As noted above, every code block executed by a SpHT while it is not paused may use split hardware transaction aware functions, such as SpHT_read and SpHT_write for all its shared memory read/write operations. Similarly, during the execution of the body of the called function, SpHT_read and SpHT_write may be used for memory accesses to the shared memory.

After the body of the called function is executed, the split hardware transaction may be paused again, as indicated by block 430. Since the called function's exit code may also cause an active hardware transaction to abort, the split hardware transaction may be paused prior to executing the called function's exit code, as indicated by block 435, and may subsequently return from the called function, as indicated by block 440. After the called function returns, the split hardware transaction may be resumed, as illustrated by block 445, and the remainder of the atomic block may be executed, as indicated by block 450. Finally, the split hardware transaction may be committed, as illustrated by block 455 and described above.

Additionally, if the hardware transaction active during the execution of the function body fails or aborts, the hardware transaction may be configured to branch to the function's exit code which will return the control to the caller. If the active hardware transaction fails during the execution of the called function, the SpHT may not commit successfully.

Surviving Context Switches and Interrupts

In some embodiments, a split hardware transaction may be completed even if it is interrupted by a context switch or an interrupt event. For instance, the split hardware transaction may be paused before the context switch or interrupt event and may be resumed afterwards. This can be done, for example, by providing the operating system with an event handler function to be executed prior to a context switch or other interrupt event. The event handler may then pause the split hardware transaction, such as by calling a SpHT_pause function or operation exposed by transaction support library 240.

Even if it is not guaranteed that an event handler function is always called before the event, the split hardware transaction may still function properly. That is, a split hardware transaction may be implemented so that even if an unexpected context switch (or other interrupt event) occurs, the split hardware transaction will abort or fail gracefully, and won't violate the atomicity of the atomic-block's execution. In some embodiments, if a split hardware transaction is not paused before such an event occurs, the active hardware transaction may abort and cause the split hardware transaction to fail. However, as discussed above, the split hardware transaction may be configured to retry a number of times before completely failing. Finally, even in the absence of any support for event handler functions, a split hardware transaction may be paused before executing instructions that are known, or suspected, to cause context switches or other interrupt events (e.g., various system calls).

Debugging Transactional Code—Breakpoints

When debugging transactional code, it might be desirable to place a breakpoint inside an atomic block. However, many HTM implementations may not support breaking the execution of a hardware transaction while keeping it viable. As described above, a breakpoint may cause hardware transactions to fail in some embodiments. With the SpHT algorithm, a breakpoint may be implemented by pausing a split hardware transaction prior to the breakpoint instruction. For example, in one embodiment, the debugger itself may be configured to pause an active split hardware transaction, such as by calling a SpHT_pause operation exposed or provided by transaction support library 240. In addition, a compiler may modify the code corresponding to an atomic block to use the SpHT mechanism when debugging is turned on, in order to allow the debugger to pause the atomic block execution. Debugging a split hardware transaction by pausing the transaction at breakpoints may, in some embodiments, be faster than always executing an atomic block using a purely software transactional mechanism when debugging. In addition, by allowing a debugger to access the split hardware transaction's local memory buffer, additional debugging features may be supported.

Omitting Some Hardware Transactions

While described above as involving multiple hardware transactions, in some embodiments, a split hardware transaction may only utilize a single, final hardware transaction. In some embodiments, only a single hardware transaction may be required to ensure that the split hardware transaction is either completed atomically or that it doesn't have any effect at all. For example, the last hardware transaction executed by the split hardware transaction may read all locations read during the split hardware transaction execution and copy all values from the write-set to their appropriate shared memory locations, so a successful commit of that transaction guarantees that the split hardware transaction takes effect atomically. Additionally, if the last hardware transaction fails or aborts, none of the locations of shared memory will be updated by the split hardware transaction and thus, the split hardware transaction has no effect at all.

A split hardware transaction may, according to one embodiment, use more than one hardware transaction to guarantee memory consistency during its execution. In other words, multiple hardware transactions may be used to ensure that during the split hardware transaction execution all values it read correspond to a consistent state of the memory. However, in some embodiments, a split hardware transaction may not need to guarantee memory consistency during the entire execution of the transaction. In many cases, some of the code between resuming and subsequently pausing or committing a split hardware transaction may be executed without a guarantee of memory consistency. For example, if the code segment does not execute any shared memory reads, or if no calculation or decision it performs is based on a value it reads, it may, in some embodiments, be executed without a guarantee of memory consistency. Thus, in some embodiments, when compiler 220 generates code that executes an atomic block using SpHT, compiler 220 may decide that a specific segment between SpHT_begin/SpHT_resume and SpHT_pause/SpHT_commit can be executed without the memory consistency guarantee, and notify the SpHT mechanism, such as by passing a parameter to the SpHT_resume/SpHT_begin method. In this case, the split hardware transaction may execute that code without an active hardware transaction, such as by not resuming the split hardware transaction, and therefore without initiating a new hardware transaction. Detecting such code segments may be done, for example, by the programmer writing the atomic block, or by a compiler, such as compiler 220, used to translate programmer code to code interfacing the split hardware transaction mechanism, according to different embodiments. Detecting these code segments may, in some embodiments, significantly reduce the number of hardware transactions and restore-state operations executed by a split hardware transaction, and thereby potentially improve its performance.

Multiple Fail Addresses:

In some embodiments and depending on the particular HTM implementation, beginning a hardware transaction may require a provided "fail address" indicating the next instruction to be executed if the hardware transaction is aborted. With the SpHT algorithm, in some embodiments, different hardware transactions initiated by a split hardware transaction may need to have different fail addresses, such as because of the need to clean-up the effect of non-transactional operations that were already executed while the SpHT was paused. For just an example, the hardware transaction running the body of a function called from within a split hardware transaction may need to branch to the function's exit code if the hardware transaction is aborted, so it can undo operations done by the function's entry code (such as popping values from a stack that it pushed upon entry). In such a case, the SpHT mechanism may be notified that the hardware transaction has failed, such as to allow subsequent attempts to resume and/or commit the split hardware transaction to immediately fail (and/or branch to the next fail address if necessary).

In some embodiments, the SpHT interface may include an additional parameter to, for example, the SpHT_begin and SpHT_resume functions. The additional parameter may specify a fail address to be used for that part of the execution of the atomic block. In addition, the SpHT interface may include a specific function, such as a SpHT_failed operation, that may notify the SpHT mechanism regarding failure of particular hardware transactions.

The following pseudo-code illustrates one embodiment of an implementation of a split hardware transaction calling a function and specifying multiple fail addresses. This first section of pseudo-code may represent one example of a programmer created atomic block. For instance, the programmer may use an "atomic" keyword and two brackets, or other language constructs, to specify the code that should be executed atomically. In the atomic block illustrated below, a function foo( ) is called. As explained before, this function's entry and/or exit code might execute NHT operations.

```
atomic
{
    <code segment 1>
    foo( ); // performs NHT operation
    <code segment 2>
}
...
```

As noted above, compiler 220 may translate the atomic block source code to code that executes it atomically using the SpHT mechanism. The following pseudo-code represents one exemplary embodiment of the code that may be generated by compiler 220. Thus, the atomic keyword and brackets may be replaced with a call to initiate the split hardware transaction (e.g., SpHT_begin). Note that, as noted above, a fail address value is passed to the SpHT_begin function and also to the subsequent SpHT_resume function. Thus, if the code between SpHT_begin and SpHT_pause fails to execute atomically (e.g., because the hardware transaction executing it aborts), execution may resume at the "failed:" label. After initializing the split hardware transaction, the translated version of <segment 1> of the atomic block may be executed before pausing the split hardware transaction prior to calling the function foo( ). As shown in the exemplary pseudo-code below, after foo( ) returns, the split hardware transaction is resumed and the translated version of <segment 2> of the atomic block is executed. Additionally, since SpHT_resume is passed a fail address as well, if <segment 2> fails to execute atomically as part of the SpHT, execution may resume at the "failed:" label.

SpHT_begin(failed)
   <translated segment 1>
   SpHT_pause( )
   foo( ); // performs NHT operation
   SpHT_resume(failed)
   <translated segment 2>
done:
   SpHT_commit( )
   goto after_atomic
failed:
   SpHT_failed( )
   goto done
after atomic:
. . .

Additionally, in some embodiments, the function foo( ) may also be translated to allow the body of the function to be executed within a hardware transaction. In the pseudo-code above, the split hardware transaction is paused prior to calling the function foo( ). Thus, as shown below, the code of foo( ) may be translated, such as by compiler 220, to resume the split hardware transaction, and therefore initiate a new hardware transaction, after executing foo( )'s entry code but prior to executing the body of function foo( ). Also, function foo( ) may also pause the split hardware transaction prior to executing any exit code, according to one embodiment.

The first section of pseudo-code below may represent an original, such as programmer generated, version of function foo( ). Following that is a section of pseudo-code that may represent a translated, such as by compiler 220, version of function foo( ) that uses the SpHT mechanism to execute the atomic block atomically.

void foo( ) {
   <entry code>
   <body>
   <exit code>
}
void foo( ) {
   <entry code>
   SpHT_resume(foo_failed)
   <translated body>
   SpHT_pause( )
foo_exit:
   <exit code>
   goto foo_done foo_failed:
   SpHT_failed( )
   goto foo_exit
foo_done:
}

For brevity, code related to retrying the transaction if the split hardware transaction fails to commit has been omitted from the above pseudo-code. In the exemplary pseudo-code above, SpHT_resume in function foo( ) is passed a different fail address than passed to SpHT_begin and SpHT_resume. Thus, if the function body fails to execute atomically, execution branches to the function exit code prior to returning to the calling function. Also, prior to returning to the caller, SpHT_failed is called, which notifies the SpHT mechanism that part of the SpHT failed and that a subsequent SpHT_resume executed by the caller must immediately fail.

Integration with HyTM

In some embodiments, one way to overcome hardware transactions not being able to complete when NHT operations are executed is to use software transactions to execute atomic blocks that fail execution by hardware transactions in a hybrid approach. While using a hybrid transactional memory approach may allow execution of atomic blocks including NHT operations, it may force any atomic block that contains a NHT operation to be executed using a software transaction, which may be much slower than an execution using a hardware transaction. This might significantly degrade program performance—especially if NHT operations are frequently common in atomic blocks. For instance, with some HTM implementations, the entry code of a function called from within the atomic block may perform NHT operations. A hybrid solution that uses software transactions to execute atomic blocks that fails execution by hardware transactions is described in U.S. application Ser. No. 10/915,502, titled "Hybrid Software/Hardware Transactional Memory", filed Aug. 10, 2004, and is herein incorporated by reference. Additionally, U.S. patent application Ser. No. 11/591,919, filed on Nov. 2, 2006, titled "System and Method for Supporting Multiple Alternative Methods for Executing Transactions", which is herein incorporated by reference.

As mentioned above, since the SpHT algorithm uses hardware transactions, it may still fail to execute some atomic blocks, and may therefore be combined in a hybrid solution, such as described above. In some embodiments, SpHT methods may be integrated with such a hybrid approach by using a split hardware transaction to try executing a atomic block that cannot be executed using a pure hardware transaction, and switching to executing it using a pure software transaction if the split hardware transaction fails (perhaps after retrying multiple times). Thus, SpHT may be considered an intermediate solution that may be tried after a purely HTM-based execution fails and before resorting to a purely STM-based execution, according to various embodiments.

Figure 6:
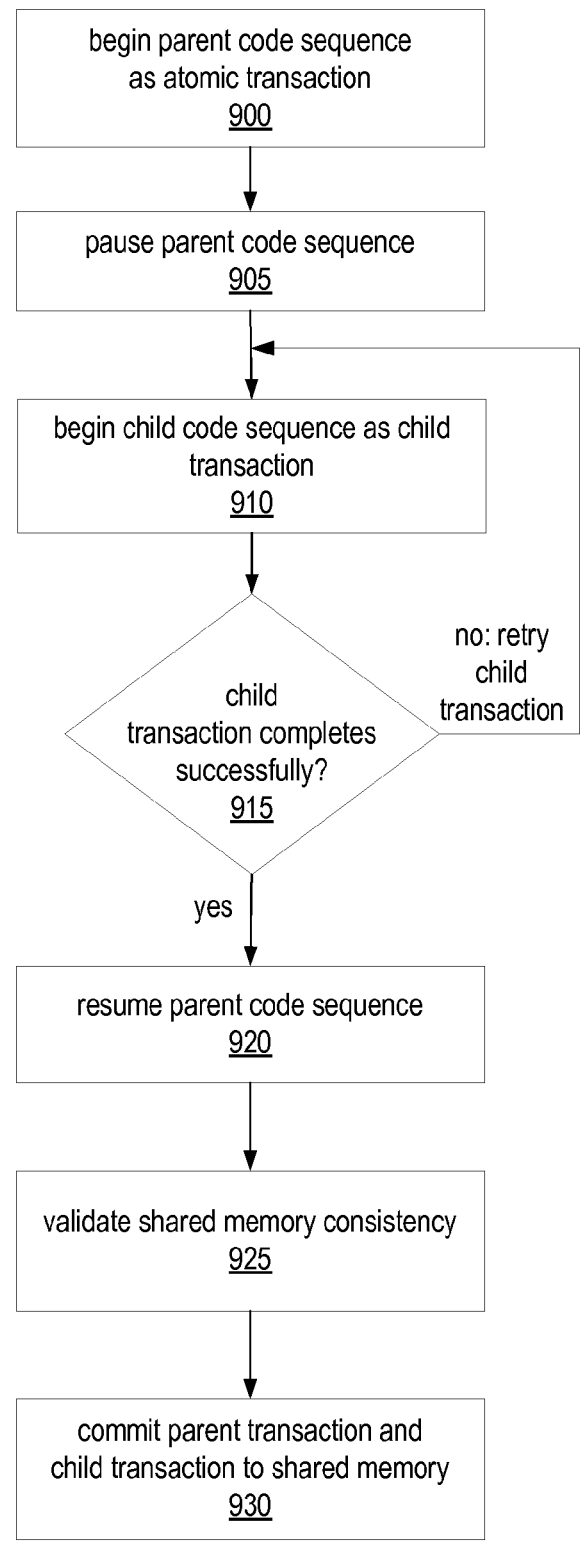
FIG. 6 is a flowchart illustrating one embodiment of a method for including split hardware transactions with other hardware and software transactions as a hybrid transactional memory approach.

FIG. 6 is a flowchart illustrating one embodiment of a method for including split hardware transactions with other hardware and software transactions as a hybrid transactional memory approach. In other embodiments, particular transaction techniques may not support particular functions or system calls, I/O calls, or certain memory access patterns. However, some executions of an atomic block that contain such non-supported instructions might not execute any of them. For example, within an atomic block, the non-supported code may only execute under certain conditions. In other words, the code in the atomic block may include one or more conditional branches only one of which may execute the non-supported code. Also, non-supported events like context switches may happen only rarely during an atomic block execution. Thus, in some embodiments, atomic transaction code 230 may be configured to start the transaction using a transaction technique that does not support the non-supported code or events, such as to use faster hardware transaction techniques for those cases in which the non-supported code or events will not be executed, but to switch over and execute the atomic block using another technique (possibly after several retries) if the non-supported code is executed.

In some embodiments, a hybrid transactional approach may first attempt to execute an atomic block using a hardware transaction technique, as illustrated by block 510. If the transaction succeeds, as indicated by the positive output of decision block 520, atomic transaction code 230 may be configured to resume normal code execution, as indicated by block 570. If however, the attempted hardware transaction technique fails, as indicated by the negative output of block 520, either a split hardware transactional technique may be attempted, as indicated by the positive output of decision block 530, or the atomic block may be executed using a software transaction technique, as illustrated by block 560. As noted above, an attempted hardware transaction may fail for any of various reasons including the occurrence of a NHT event or operation.

If execution of the atomic block is attempted using a split hardware transaction technique, as indicted by block 540, and if the split hardware transaction succeeds, as indicated by the positive output of block 550, normal code execution may be resumed, as in block 570. If however, the attempted split hardware transaction technique fails, as indicated by the negative output of block 550, the atomic block may be executed using a software transaction technique, as in block 560. In general, it may be assumed, according to some embodiments, that a software transactional memory (STM) technique, such as indicated by block 560, will always succeed. In some cases a software transaction may be retried several times before succeeding.

Thus, as illustrated in FIG. 6, multiple types of transaction techniques (e.g., HTM, SpHT, STM, etc.) may be used when executing (or attempting to execute) an atomic block of code. For simplicity, the retrying of transactions and transactional techniques is not illustrated in FIG. 6. In various embodiments, however, different transactional techniques may be tried multiple times prior to attempting a different transactional technique. Additionally, in some embodiments, rather than execute the atomic block using a software transactional technique if a split hardware transactional technique fails, as illustrated in FIG. 6, a hybrid transactional system may retry to execute the atomic block using the hardware transactional technique again before resorting to a software transactional technique.

Additionally, in some embodiments, an atomic block may be executing initially with one transactional memory technique and then continue with another without re-executing the whole atomic block. For instance, in one embodiment, if a split hardware transaction is begun and then at some point paused and resumed, and then the active hardware transaction aborts, the read and write sets maintained by the previous (committed) hardware transaction of the SpHT may be used to continue the execution with a software transaction. Instead of re-executing the whole atomic block with a software transaction, the transactional memory technique may start at the point where the SpHT failed, by using the data already gathered by the SpHT, if still valid. In some embodiments, a software transaction may check for the validity of the data in the read and write sets in the same way as SpHT_resume (i.e., such as by re-reading all locations indicated by the read set and verifying that they all still have their respective pre-transactional values. After that point, the atomicity property of the software transaction guarantees that it will abort if any of these locations changes before it tries to commit, according to some embodiments.

In some embodiments, however, compiler 220 may be configured to determine whether or not an atomic block involves code that is not supported by a particular transaction technique and to generate atomic transaction code 230 such that the particular transaction technique is not attempted. Additionally, while described above regarding first beginning a hardware transaction technique and then switching to a split hardware transaction technique and then using a software transaction technique only if the split hardware transaction fails, in general, the method described above regarding FIG. 6 may be applied to any transactional techniques in which a transaction involves (or potentially involves) non-hardware-transactionable (NHT) operations or any instructions not supported by one of the transaction techniques.

In some embodiments, additional code may be executed by the hardware transactions initiated by a SpHT to guarantee that hardware and software transactions live safely together and do not violate the atomicity of one another. For example, the active hardware transactions of a split hardware transaction may call special functions before any read or write access that checks whether the particular access conflicts with an ongoing software transaction. If it does, the hardware transaction may be aborted. If the access does not conflict with an ongoing software transaction, permission to execute the transactional read or write operation may be granted to the hardware transaction. Furthermore, although only the last hardware transaction initiated by a SpHT may execute the atomic block's writes to the shared memory, coordination calls may be required in all of the other hardware transactions as well, in one embodiment. Without such coordination, a hardware transaction might see a partial effect of a software transaction, violating the atomicity of the atomic block's execution.

Access to the Read/Write Set

For some applications, it might be useful to allow non-transactional code access to the local read and write sets maintained by the running split hardware transaction. For example, a debugger that uses SpHT to stop the execution on a breakpoint inside an atomic block may benefit from such access to provide debugging within transactions.

Hardware Support

The SpHT mechanism may maintain the read and write sets completely in software and only use the hardware transactions to guarantee atomicity and memory consistency. Therefore, split hardware transactions may be used on virtually any system that provides minimal HTM support: that is, the ability to begin, abort and commit hardware transactions.

In one embodiment, if the HTM implementation supports non-transactional read and write operations while a hardware transaction is executing, such operations may be used for all accesses to the read and write sets. This may reduce the number of memory accesses done transactionally by a SpHT, and therefore might improve the performance of the SpHT mechanism (if the non-transactional read/write operations are more efficient than the transactional ones), and/or increase the chance that the hardware transactions it uses commits successfully.

In another embodiment, if the HTM implementation supports non-transactional read and write operations while a hardware transaction is executing, a SpHT may be able to commit successfully even if some of the hardware transactions it has executed were aborted and not retried. This can be done, for example, by using the non-transactional write operations to update the read and write sets and record the "progress" of the execution, for example by indicating that the execution has reached a given checkpoint, and the status of the read and write sets at this checkpoint. Then, if the active hardware transaction is aborted, the SpHT may continue executing from the last recorded checkpoint, without retrying the whole code block executed by the aborted hardware transaction. This method may be especially useful with unpredictable NHT events (e.g. a context switch), in which case it may not be possible for the SpHT to pause before the event. The SpHT may be able to recover and continue the execution after an unpredicted NHT event without retrying the SpHT as a whole.

Figure 7:
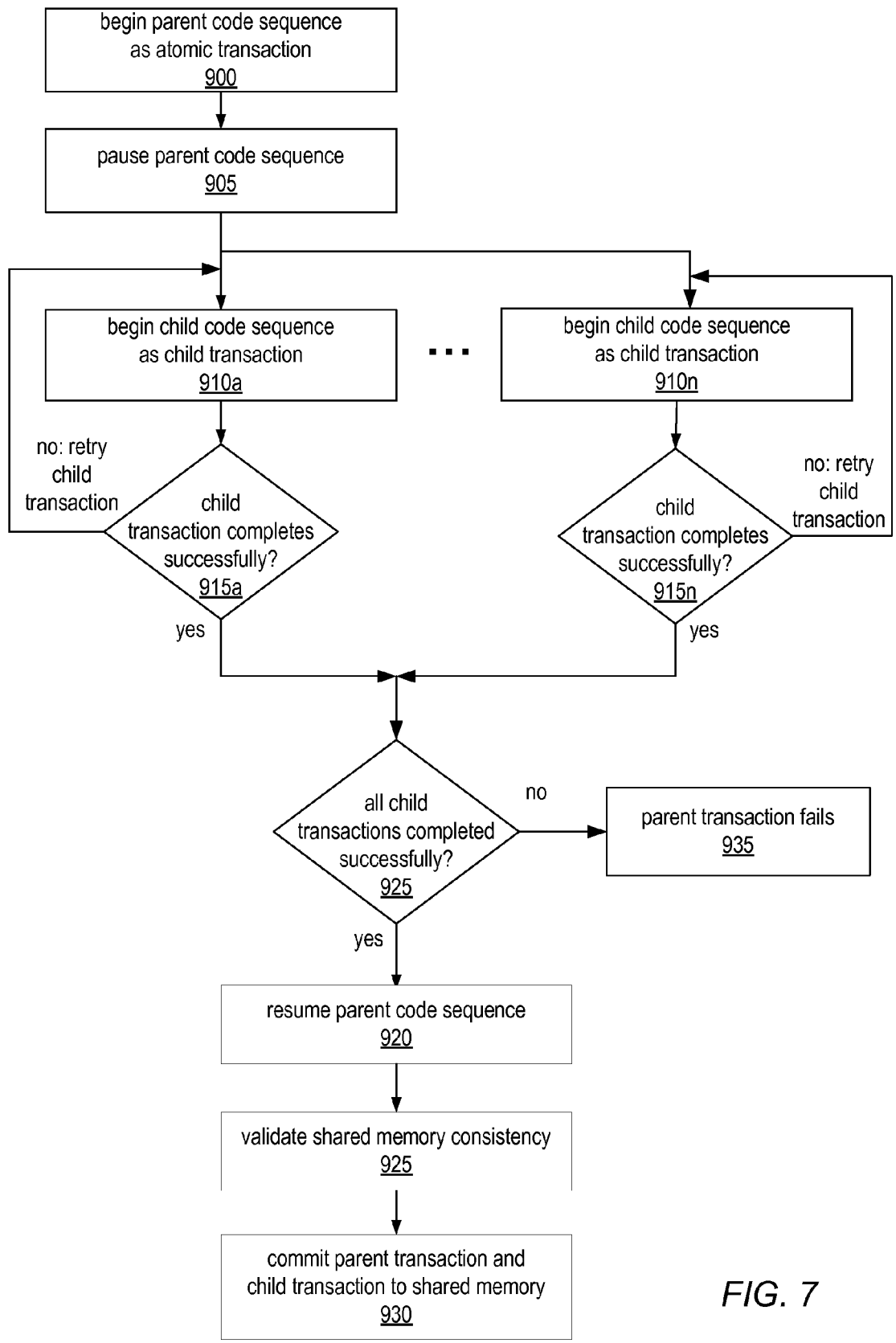
FIG. 7 is a block diagram illustrating an exemplary computer system capable of implementing multiple, alternative methods for executing transactions according to one embodiment.
Figure 8A:
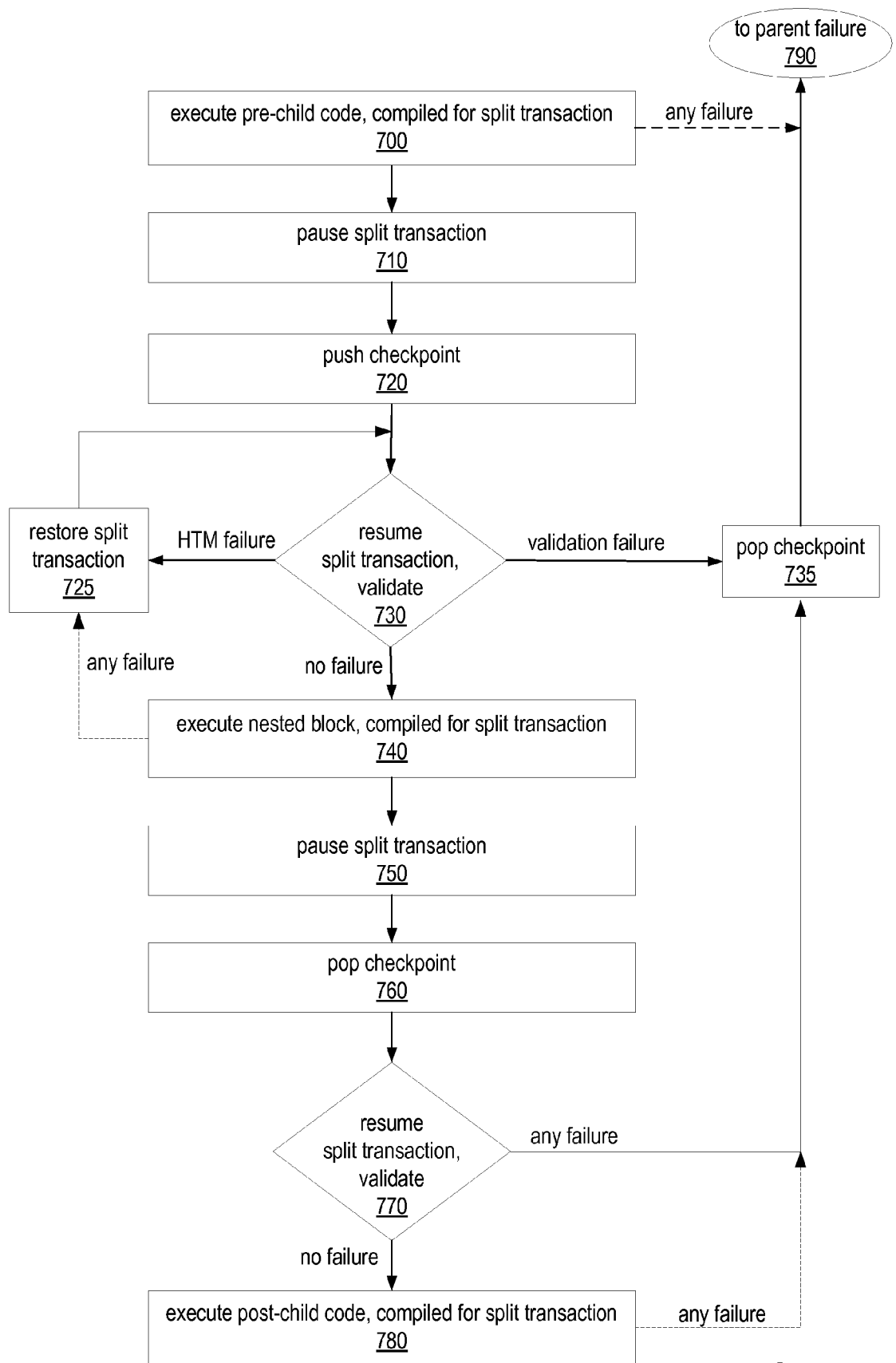
Figure 8B:
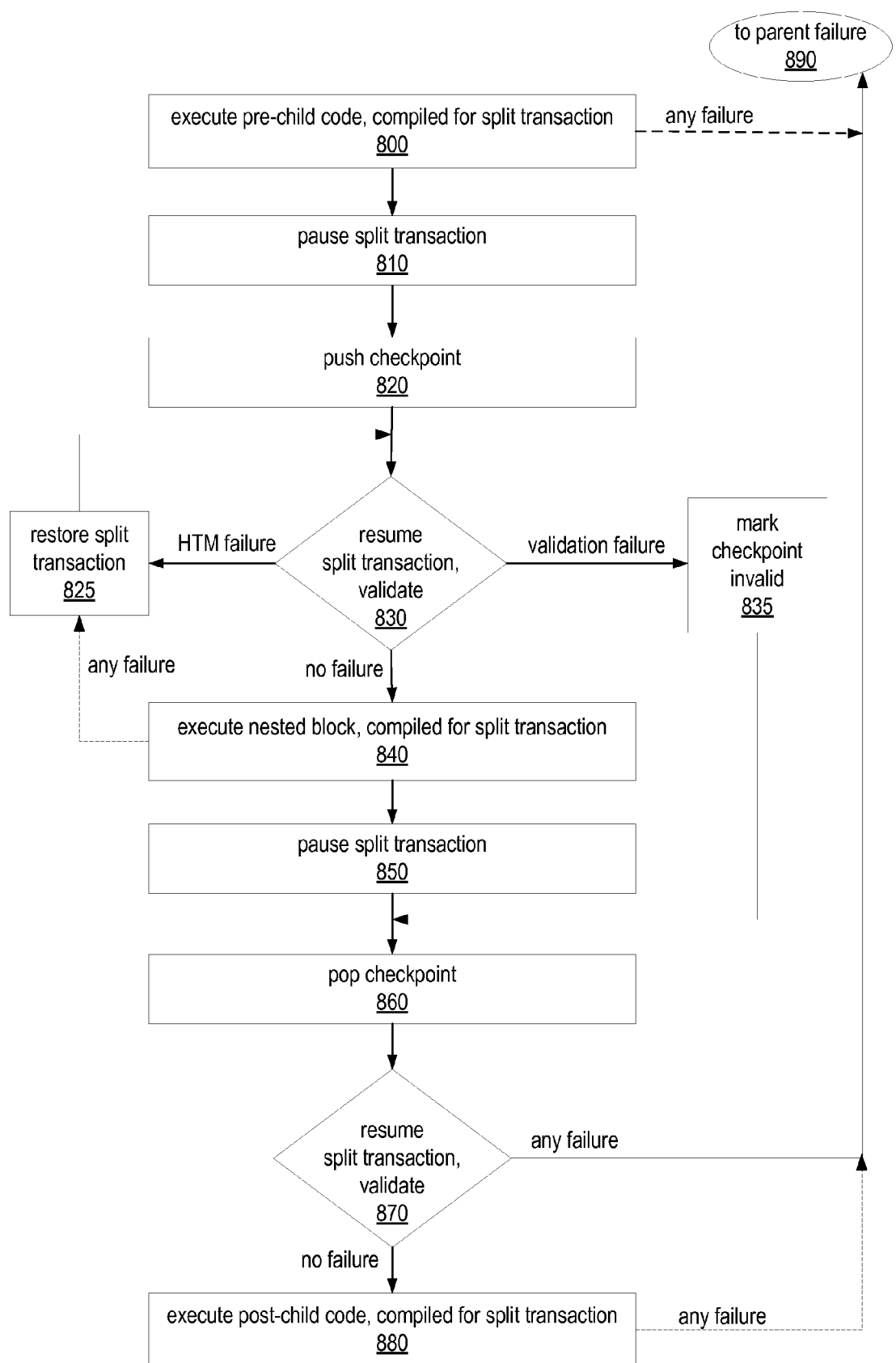
Figure 9:
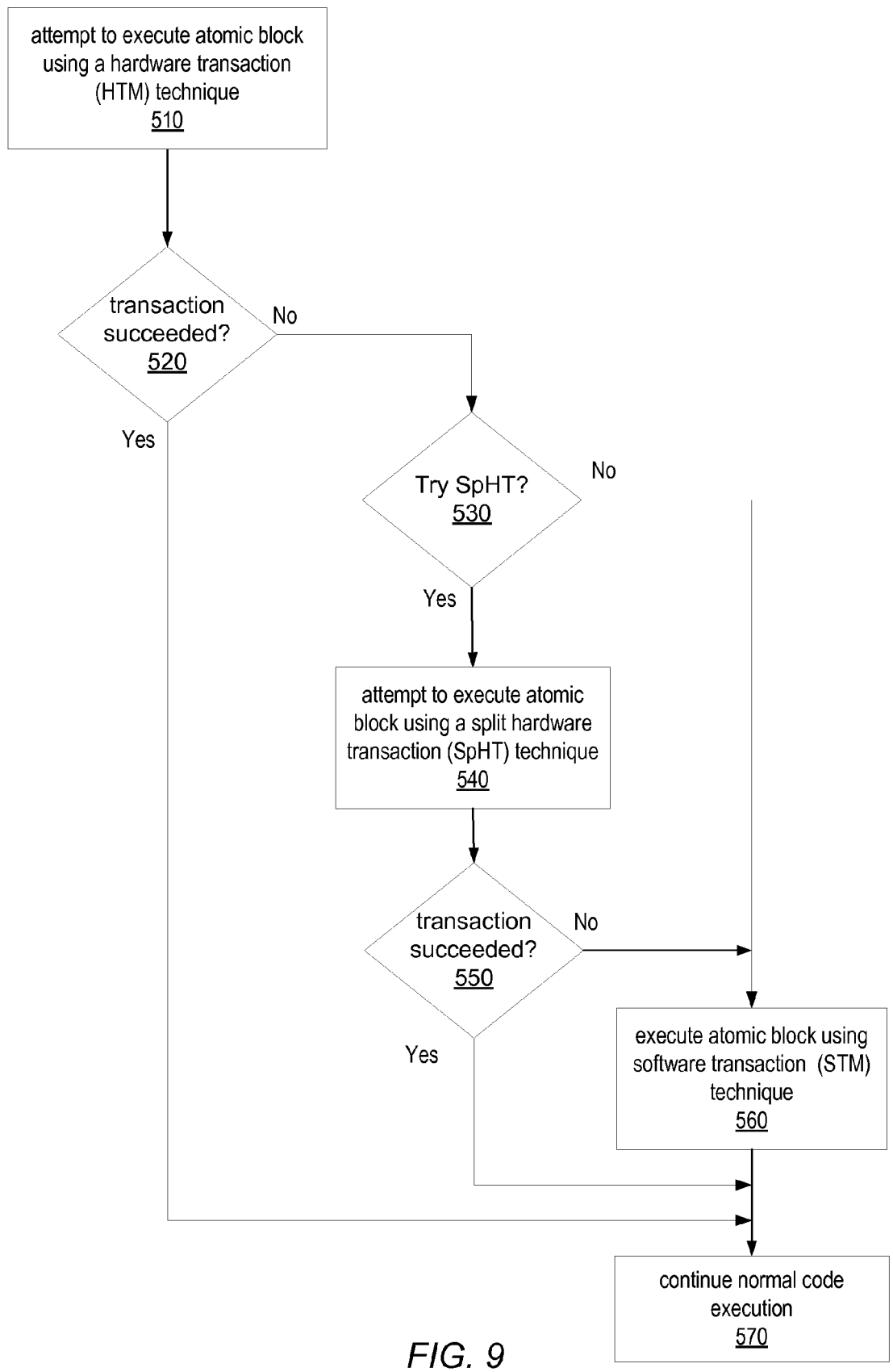
Figure 10:
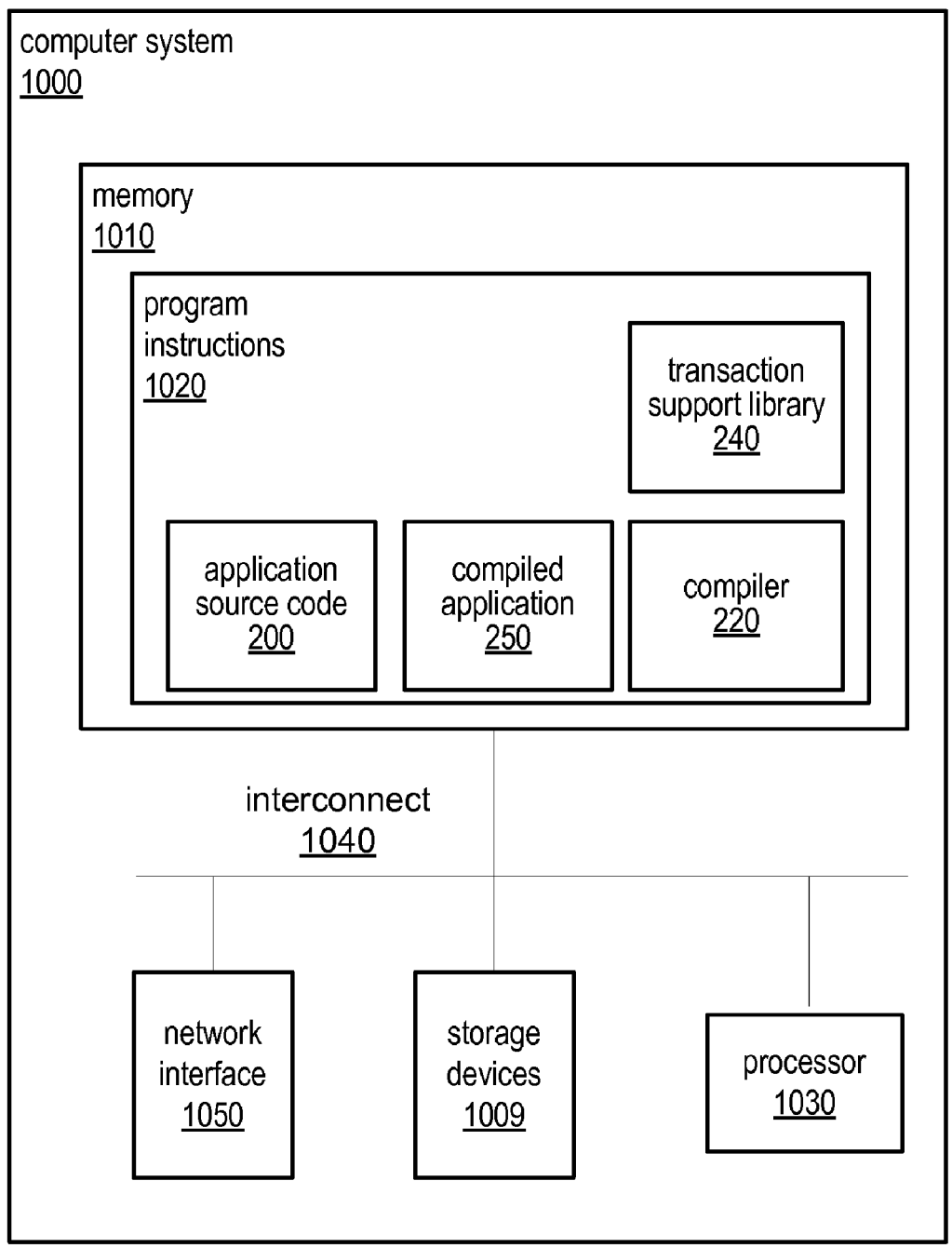

FIG. 7 illustrates a computing system capable of implementing split hardware transactions, as described herein and according to various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The described invention may be provided as a computer program product, or software, that may include a computer-readable storage medium having stored thereon instructions, which may be used to program a computer system (or other electronic devices) to perform a process according to the present invention. A computer-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 1000 may include a processor unit 1030 (possibly including multiple processors, a single-threaded processor, a multi-threaded processor, a multi-core processor, etc.). The computer system 1000 also includes one or more system memories 1010 (e.g., one or more of cache, SRAM DRAM, RDRAM, EDO RAM, DDR RAM, SDRAM, Rambus RAM, EEPROM, etc.), a system interconnect 1040 (e.g., LDT, PCI, ISA, etc.), a network interface 1050 (e.g., an ATM interface, an Ethernet interface, a Frame Relay interface, etc.), and a storage device(s) (e.g., optical storage, magnetic storage, etc.). The memory medium may include other types of memory as well, or combinations thereof. Embodiments of the invention may include fewer or additional components not illustrated in FIG. 7 (e.g., video cards, audio cards, additional network interfaces, peripheral devices, etc.). The processor unit 1030, the storage device(s) 1009, the network interface 1050, and the system memory 1010 are coupled to the system interconnect 1040. One or more of the system memories 1010 may embody a compiler configured to generate program instructions for implementing split hardware transactions as described herein. Additionally, one or more of the system memories 1010 may embody an application including code implementing split hardware transactions.

In some embodiments, memory 1010 may include program instructions 1020 configured to implement a compiler, such as compiler 220, configured to provide generate program instructions for implementing split hardware transactions, as described herein. Additionally, program instructions 1020 may comprise application source code 200 including code configured to request or specify split hardware transactions, as well as compiled application 250, as described herein. Furthermore, program instructions 1020 may be configured to implement a transaction support library 240, configured to provide functions, operations and/or other processes for implementing split hardware transactions, as described herein. Compiler 220, application source code 200, compiled application 250, and/or transaction support library 240 may each be implemented in any of various programming languages or methods. For example, in one embodiment, compiler 220 and transaction support library 240 may be Java™ based, while in other embodiments, they may be written using the C or C++ programming languages. Similarly, application code 200 may be implemented in Java™, C, or C++, among other programming languages, according to various embodiments. Moreover, in some embodiments, compiler 220, transaction support library 240, and application code 200 may not be implemented using the same programming language. For example, application code 200 may be C++ based, while compiler 220 may be developed using C. Note also that although various examples included herein refer to both shared memory and local memory, these structures may be implemented as different memory spaces (e.g., a shared memory space and one or more local memory spaces) within a single physical memory or as different memory spaces distributed across any number of physical memories, in different embodiments.

While the invention has been described with reference to various embodiments, it will be understood that these embodiments are illustrative and that the scope of the invention is not limited to them. Although the embodiments above have been described in detail, numerous variations and modifications will become apparent once the above disclosure is fully appreciated. Many variations, modifications, additions, and improvements are possible. More generally, the present invention is described in the context of particular embodiments. For example, the blocks and logic units identified in the description are for understanding the described invention and not meant to limit the described invention. Functionality may be separated or combined in blocks differently in various realizations of the invention or described with different terminology. Plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow. It is intended that the following claims be interpreted to embrace all such variations and modifications.

What is claimed is:

1. A computer-implemented method for implementing a split hardware transaction, comprising:

initiating execution of an atomic block of code comprising two or more segments of code, wherein each segment comprises code to implement one or more memory accesses targeted to a shared memory space;

for each segment of the atomic block, executing the segment as a hardware transaction, wherein in said executing the segment, executing any write accesses targeted to the shared memory space comprises writing values to a local memory space rather than to the shared memory space;

subsequent to executing all of the two or more segments, determining if all values read by the atomic block of code are consistent with a current state of the shared memory space; and in response to determining that all values read by the atomic block are consistent with the current state of the shared memory space, committing results of the execution of the atomic block in the shared memory space, wherein in said committing results, atomicity is guaranteed across the atomic block;

wherein said determining and said committing are performed by a single hardware transaction.

2. The method of claim 1, further comprising, for each segment, subsequent to said executing the segment, committing the hardware transaction for the segment.

3. The method of claim 1, wherein said committing results in the shared memory space is performed as part of an operation to commit a hardware transaction corresponding to a last of the two or more segments.

4. The method of claim 1, further comprising, for at least one of the two or more segments, prior to said executing the segment, determining if all values previously read by the atomic block are consistent with a current state of the shared memory space, wherein said executing the segment is performed in response to determining that all values previously read by the atomic block are consistent with the current state of the shared memory space.

5. The method of claim 1, further comprising, subsequent to executing one of the two or more segments and prior to executing another one of the two or more segments, executing one or more non-hardware-transactionable (NHT) operations.

6. The method of claim 5, wherein said one or more NHT operations comprises one or more function calls.

7. The method of claim 1, wherein in said executing the segment, executing read accesses of the segment targeted to addresses in the shared memory space comprises copying values from the shared memory space to the local memory space.

8. The method of claim 7, wherein said determining comprises comparing values of locations in the shared memory space targeted by previously executed read accesses of the atomic block to values in the local memory space to determine if any of the values of the locations in the shared memory space have been modified subsequent to said copying to the local memory space.

9. The method of claim 7, further comprising aborting execution of the atomic block in response to determining that a value of one or more locations in the shared memory space was modified subsequent to said copying to the local memory space.

10. The method of claim 7, further comprising retrying execution of at least one segment of the atomic block in response to determining that a value of one or more of the locations in the shared memory space was modified subsequent to said copying to the local memory space.

11. The method of claim 1, wherein said committing results comprises copying results of write accesses targeted to the shared memory space from the local memory space to the targeted locations in the shared memory space.

12. A system supporting a split hardware transaction, comprising:

a processor; and a memory coupled to the processor, wherein the memory comprises program instructions executable by the processor to implement:

initiating execution of an atomic block of code comprising two or more segments of code, wherein each segment comprises code to implement one or more memory accesses targeted to a shared memory space;

for each segment of the atomic block, executing the segment as a hardware transaction, wherein in said executing the segment, executing any write accesses targeted to the shared memory space comprises writing values to a local memory space rather than to the shared memory space;

subsequent to executing all of the two or more segments, determining if all values read by the atomic block of code are consistent with a current state of the shared memory space; and in response to determining that all values read by the atomic block are consistent with the current state of the shared memory space, committing results of the execution of the atomic block in the shared memory space, wherein in said committing results, atomicity is guaranteed across the atomic block;

wherein said determining and said committing are performed by a single hardware transaction.

13. The system of claim 12, wherein the program instructions are further executable to implement, for at least one of the two or more segments, prior to said executing the segment, determining if all values previously read by the atomic block are consistent with a current state of the shared memory space, wherein said executing the segment is performed in response to determining that all values previously read by the atomic block are consistent with the current state of the shared memory space.

14. The system of claim 12, wherein the program instructions are further executable to implement, subsequent to executing one of the two or more segments and prior to executing another one of the two or more segments, executing one or more non-hardware-transactionable (NHT) operations.

15. The system of claim 12, wherein in said executing the segment, executing read accesses of the segment targeted to addresses in the shared memory space comprises copying values from the shared memory space to the local memory space; and wherein said determining comprises comparing values of locations in the shared memory space targeted by previously executed read accesses of the atomic block to values in the local memory space to determine if any of the values of the locations in the shared memory space have been modified subsequent to said copying to the local memory space.

16. The system of claim 12, wherein the program instructions are further executable to implement retrying execution of at least one segment of the atomic block in response to determining that a value of one or more of the locations in the shared memory space was modified subsequent to said copying to the local memory space.

17. A computer-readable storage medium, comprising program instructions for supporting a split hardware transaction, wherein the program instructions are computer-executable to implement:

initiating execution of an atomic block of code comprising two or more segments of code, wherein each segment comprises code to implement one or more memory accesses targeted to a shared memory space;

for each segment of the atomic block, executing the segment as a hardware transaction, wherein in said executing the segment, executing any write accesses targeted to the shared memory space comprises writing values to a local memory space rather than to the shared memory space;

subsequent to executing all of the two or more segments, determining if all values read by the atomic block of code are consistent with a current state of the shared memory space; and in response to determining that all values read by the atomic block are consistent with the current state of the shared memory space, committing results of the execution of the atomic block in the shared memory space, wherein in said committing results, atomicity is guaranteed across the atomic block;

wherein said determining and said committing are performed by a single hardware transaction.

18. The storage medium of claim 17, wherein the program instructions are further executable to implement, for at least one of the two or more segments, prior to said executing the segment, determining if all values previously read by the atomic block are consistent with a current state of the shared memory space, wherein said executing the segment is performed in response to determining that all values previously read by the atomic block are consistent with the current state of the shared memory space.

19. The storage medium of claim 17, wherein the program instructions are further executable to implement, subsequent to executing one of the two or more segments and prior to executing another one of the two or more segments, executing one or more non-hardware-transactionable (NHT) operations.

20. The storage medium of claim 17, wherein in said executing the segment, executing read accesses of the segment targeted to addresses in the shared memory space comprises copying values from the shared memory space to the local memory space; and wherein said determining comprises comparing values of locations in the shared memory space targeted by previously executed read accesses of the atomic block to values in the local memory space to determine if any of the values of the locations in the shared memory space have been modified subsequent to said copying to the local memory space.

* * * * *